United States Patent [19]

Titus et al.

[11] Patent Number: 4,808,650

[45] Date of Patent: Feb. 28, 1989

[54] HIGH CLARITY POLYOLEFIN COMPOSITIONS AND CLARIFYING ADDITIVE THEREIN

[75] Inventors: George R. Titus, Raleigh; Joel L. Williams, Cary, both of N.C.

[73] Assignee: Becton, Dickinson and Company, Franklin Lakes, N.J.

[21] Appl. No.: 168,054

[22] Filed: Mar. 14, 1988

[51] Int. Cl.$^4$ ................................................ C08K 5/15
[52] U.S. Cl. .................................................... 524/108
[58] Field of Search ........................................ 524/108

[56] References Cited

U.S. PATENT DOCUMENTS

| 4,016,118 | 4/1977 | Hamada | 524/108 |
| 4,371,645 | 2/1983 | Mahaffey | 524/108 |
| 4,483,952 | 11/1984 | Ichiyama | 524/108 |

FOREIGN PATENT DOCUMENTS

0157840  9/1983  Japan ................................. 524/108

Primary Examiner—Joseph L. Schofer
Assistant Examiner—Peter D. Mulcahy
Attorney, Agent, or Firm—Richard E. Brown

[57] ABSTRACT

Polyolefin compositions of high clarity containing clarifying amounts of fluorinated dibenzylidene sorbitol additives.

2 Claims, No Drawings

HIGH CLARITY POLYOLEFIN COMPOSITIONS AND CLARIFYING ADDITIVE THEREIN

BACKGROUND OF THE INVENTION

1. Field of the Invention

This invention relates to polyolefin compositions of improved clarity and, more particularly and in addition thereto, relates to a new additive which confers improved clarity to polyolefins.

2. Background of the Invention

For many applications, polymeric products have been fabricated into structural or block forms, such as fibers, which utilize properties based on their high molecular weights. In recent years, applications have been developed, such as plates, sheets, films and the like, in which clarity or transparency is a very desirable property. Clarity is also very important for certain plastic articles, such as syringes, made by injection molding.

In general, clarity is not an inherent property of polyolefin plastics, most of which are more or less opaque due principally to their partially amorphous nature. Most polyolefins do, however, have some crystallinity, and they are generally referred to as semicrystalline. High clarity is thought to be related to a low degree of crystallinity. Size and number of crystals, however, is also important. Large crystals reduce clarity, an effect generally thought to be due to diffraction and scattering of light, and most polyolefins of good clarity are predominantly microcrystalline. It is generally thought that the crystal size should be at or smaller than the wavelength of visible light to prevent light scattering, which causes opacity.

Various additives for polyolefins, conventionally referred to as nucleators, which promote crystallization have been disclosed. U.S. Pat. No. 4,016,118 to Hamada et al. teaches improved clarity and resistance to mold shrinkage in polyolefins containing from about 0.1% to 0.7% of dibenzylidene sorbitol. Other dibenzylidene sorbitol clarifying additives postulated to function by reducing crystal size are disclosed in U.S. Pat. No. 4,371,645 to Mahaffey and U.S. Pat. No. 4,483,952 to Uchiyama. In the former patent, the phenyl rings are substituted with at least one halogen atom, and may additionally have alkyl, hydroxy, methoxy, amino or nitro substituent groups. The dibenzylidene sorbitols of the latter patent have chloro, alkyl or alkoxy substituents in each of the phenyl rings.

Prior art dibenzylidene sorbitol additives have resulted in polyolefin compositions having improved clarity, resistance to shrinkage and heat deterioration without loss of mechanical strength. There is, however, a definite need for further improvements, particularly with respect to clarity. It is toward the fulfillment of this need that the present invention is directed.

SUMMARY OF THE INVENTION

One aspect of the present invention is a polymeric composition having improved clarity. A polymer, preferably a polyolefin, is formulated with a clarifying amount of 3,3'-difluoro- or 3,4,3',4'-tetrafluorodibenzylidene sorbitol. In another aspect of the invention, there is provided new fluorinated dibenzylidene sorbitol clarifying additives for polymers. In accordance with the invention, the preferred polyolefin composition containing only 0.50% by weight of the inventive 3,3',4,4'-tetrafluoro additive has a clarity, as determined by the conventional haze value, greater than any polyolefin composition heretofore disclosed.

Significant advantages with respect to production costs are also realized with the additives of the present invention. Because high clarity compositions are achieved with as little as 0.10% of the additives, the total additive package required per batch of oolyolefin composition is reduced, resulting in cost savings. Further, since the additives of the invention increase the temperature at which a polyolefin composition in a mold crystallizes, the mold can be opened sooner to remove the contents. The reduced "mold time" provides a savings in time which is translated into a cost saving because the mold can produce more units of product in a given period of time.

DETAILED DESCRIPTION

While this invention is satisfied by embodiments in many different forms, there will herein be described in detail preferred embodiments of the invention, with the understanding that the present disclosure is to be considered as exemplary of the principles of the invention and is not intended to limit the invention to the embodiments described. The scope of the invention will be measured by the appended claims and their equivalents.

The polyolefin component of the composition of the present invention having high clarity may be a homopolymer or copolymer of an aliphatic monoolefin, preferably with 2 to 6 carbon atoms, having a number average molecular weight of about 10,000 to 400,000, preferably about 30,000 to 150,000. The polyolefins of the present invention may be described as basically linear, but may optionally contain side chains such as are found, for instance, in conventional, low density polyethylene. Exemplary of such polyolefins are polyethylene, polymethylpentene, polytetrafluoroethylene and the like. The preferred polyolefin is polypropylene.

The polyolefin may contain a small amount, generally from 1 to 10 percent of an additional polymer incorporated into the composition by copolymerization with the appropriate monomer. Such copolymers may be added to the composition to enhance other characteristics of the final composition, and may be, for example, polyacrylate, polyvinyl, polystyrene and the like.

The clarifying additives of the present invention consist substantially of dibenzylidene sorbitols of the following structure:

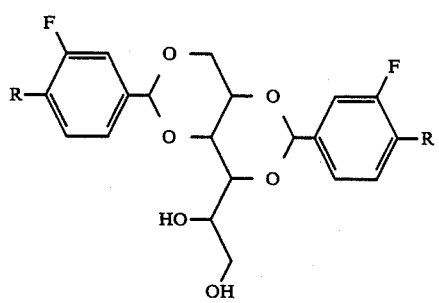

wherein R may be hydrogen or fluorine.

It is understood with regard to the structural formula set forth above that while only the 1,3:,2,4 isomer is represented, this structure is provided for convenience only and the invention is not limited to isomers of the 1,3:,2,4 type, but may include any and all other isomers and mixtures thereof provided that the additive has two fluorinated benzylidene groups on the sorbitol moiety.

The additives of the invention may be prepared by any suitable sequence of reactions as known in the art. A particularly convenient method is acid-catalyzed condensation of the appropriate fluorinated benzaldehyde with sorbitol. The stoichiometry of this reaction is two moles of aldehyde per mole of sorbitol, and while the preferred ratio of these reactants is at or close to 2:1, other ratios deviating from this preferred value, but still suitable for preparation of the additives, are readily apparent to one ordinarily skilled in the art. Likewise, selection of suitable solvents, acid catalysts, reaction conditions, workup conditions and product isolation procedures are well within the purview of one skilled in the art. A representative non-limiting synthetic procedure is given in Example I, below.

Condensation of a benzaldehyde and sorbitol under the above conditions leads predominately to the dibenzylidene derivative of the invention. It is appreciated, however, that biproduct mono- and tribenzylidene derivatives will also be formed, the quantity of the biproducts formed being variable depending on the reaction workup and purification procedures. In general, it is not necessary to remove these biproducts because the clarifying effectiveness of the dibenzylidene sorbitols of the invention are not substantially decreased by the presence of the biproducts. It is intended, however, that the additives of the invention consist of 90% or higher of the dibenzylidene sorbitol additive of the structure shown. As known in the art, tribenzylidene biproducts may be substantially removed by extraction or trituration of the crude isolate with a nonpolar solvent, and monobenzylidene biproducts may be removed by recrystallization from a suitable solvent. Such purification techniques are routine and well-known to those skilled in the art.

Clarifying properties are conferred when the additive of the invention is formulated into the polyolefin composition in a quantity within the range of about 0.0005 to 2% by weight. Higher percentages of additives may be used but generally provide no perceived advantage. The preferred concentration range may be from about 0.1 to 0.8%, most preferably, from about 0.3% to 0.6%.

Other additives as known in the art may be added to provide other desirable properties to the composition. For example, fillers, coloring agents, plasticizers, antistatic materials, wetting agents and the like may be added in suitable quantities providing no deleterious effects in the desired clarity or mechanical strength are introduced. In addition, other known clarifying additives, as for example, organic acids and metal salts thereof, such as para-t-butylbenzoic acid, may be incorporated into the composition.

Preparation of the composition of the invention from its constituent parts is routine and may be carried out by any conventional mixing means.

Clarity of a polyolefin composition is conventionally reported as the haze value. Haze values of the compositions of the invention may be determined in accordance with ASTM procedure D-1003. In the Table, representative polypropylene-additive compositions of the invention and their haze values are shown and compared with prior art polypropylene compositions containing halogenated sorbitol additives.

TABLE

| | DIBENZYLIDENE-SORBITOL ADDITIVE | CONCENTRATION % BY WEIGHT | HAZE MEASURED | HAZE PREDICTED |
|---|---|---|---|---|
| 1 | 4,4' dichloro | .25 | 10[2] 20[1] | |
| | | .50 | 8[2] 8[1] | |
| 2 | 3,4,3',4' tetrachloro | .50 | 8[2] | |
| 3 | 4,4' difluoro | .25 | 17[2] | |
| | | .50 | | 13.6[3] |
| 4 | 3,4,3'4' tetrafluoro | .10 | 34[1] | |
| | | .20 | 19[1] | |
| | | .25 | 11[1] | |
| | | .40 | 7[1] | |
| | | .50 | 5[1] | 13.6[3] |
| | | .60 | 7[1] | |
| | | .80 | 8[1] | |
| 5 | 3,3' difluoro | .25 | 15[1] | |
| | | .50 | 8[1] | |

[1] in accordance with Example II
[2] from Mahaffey, USP 4,371,645
[3] based on extrapolation from the reported haze values of prior art additives 1, 2, and 3.

It is seen from the Table that the inventive tetrafluoro additive 4 has a haze value of 5 when used at a concentration of 0.50%. This is the lowest haze value for any polyolefin clarifying additive heretofore disclosed. The lowest haze value previously reported, 8, is fully 60% higher.

From the haze data on prior art additives 1, 2, and 3, it would have been predicted that the inventive tetrafluoro additive 4 would have a haze value of 13.6 instead of the wholly unexpected value of 5.

In a first line of reasoning, it is seen that doubling the concentration of prior art dichloro additive 1 from 0.25% to 0.50% reduced haze by 20% (10 to 8). Therefore, it would be predicted that doubling the concentration of the 4,4'-difluoro additive 3 from 0.25% to 0.50% would likewise reduce haze by 20% (17 to 13.6). Since the dichloro and tetrachloro additives at 0.50% have the same haze (8) it would be predicted that the difluoro and tetrafluoro additives at 0.50% likewise would be the same, i.e., a haze value of 13.6.

In a second line of reasoning, it is seen that, at 0.25% concentration, the reported haze of the 4,4'-difluoro additive 3 is 70% higher than that reported for the dichloro additive 1 (17 vs 10). The haze of the tetrafluoro additive would therefore be predicted to be 70% higher than the tetrachloro, i.e., 70% higher than 8, or 13.6.

By either of these lines of reasoning, the data in the prior art would have predicted a haze of about 2½ times the value actually observed for the tetrafluoro additive 4 of the invention.

By another line of reasoning, the two tetrahalogenated additives, 2 and 4, would be expected to have about the same haze values. In fact, the haze value (8) of the prior art tetrachloro additive 2 is 60% higher than that of the inventive tetrafluoro additive 4 (haze value 5).

Comparison of difluorinated additives 3 and 5 reveals that, at 0.25% concentration, the haze value of the prior art 4,4'-difluoro additive is 14% higher than that of the inventive 3,3'-difluoro additive (15 vs 17). This improvement, resulting from introduction of fluorine atoms into the 3 and 3' positions, is also surprising in view of the identical haze values reported for the 4,4'-dichloro and the 3,3',4,4'-tetrachloro additives of the prior art.

It is evident from the above analyses of the reported and observed data that fluorine atoms in the 3 and 3' positions make a major contribution to clarity, and act synergistically with fluorine atoms in the 4 and 4' positions to provide a tetrafluoro additive having the highest clarity heretofore reported. This result is wholly unexpected and could not have been predicted from data in the art.

EXAMPLE I

Synthesis of 3,4,3',4'-tetrafluorddibenzylidene Sorbitol

A mixture of two moles of 3,4-difluorobenzaldehyde, one mole of sorbitol, cyclohexane (1000 ml), dimethylsulfoxide (10-20 ml.) and p-toluenesulfonic acid was refluxed with vigorous stirring under nitrogen until two moles of water were collected by azeotropic distillation. The reaction mixture was cooled and neutralized with triethylamine. The precipitate was filtered, washed with hot water, hot ethanol and dried to give a yield varying from run to run of 69-85% based on sorbitol.

nmr: $\alpha$3.97-4.73 (8H,m, carbohydrate): $\alpha$5.79(2H,s, acetals); $\alpha$7.07-7.63(6H,m, aromatic).

EXAMPLE II

Preparation of Polyolefin-Additive Composition

Polypropylene (500 g), obtained in pellet form from the manufacturer, was shaken with 3,4,3',4'-tetrafluorodibenzylidene sorbitol (2.5 g, finely powdered) to coat the pellets electrostatically. The pellets were then extruded through a single screw extruder at 210° C., cooled in a water bath, and re-pelletized.

The new pellets were then molded into step plaques 50×75 mm in overall dimension by injection molding. The upper step was 0.080 inches thick while the lower step was 0.040 inches thick.

The haze values reported in the Table were from 0.040 inch step and were measured using ASTM Method D1003 on compositions containing the indicated percentages of additives.

Thus, in accordance with the invention, there is provided new polyolefin compositions having the highest clarity heretofore disclosed. The compositions result from inclusion of new fluorinated dibenzylidene sorbitol additives. Savings in production costs are also achieved because high clarity is achieved with very low oercentages of additive, and because the compositions of the invention have a higher crystallization temoerature giving reduced mold times.

What is claimed is:

1. A composition comprising a polyolefin and from about 0.4% to about 0.6% by weight 3,4,3',4'-tetrafluorodibenzylidene sorbitol.

2. The composition of claim 1 wherein said polyolefin is selected from the group consisting of polyethylene, polypropylene, polymethylpentene and polytetrafluoroethylene.

* * * * *